Feb. 20, 1923.

M. C. M. LANE.
VARIABLE INDUCTANCE.
FILED JUNE 2, 1922.

1,445,896.

INVENTOR
Marvin C. M. Lane
BY
E. W. Marshall
ATTORNEY

Patented Feb. 20, 1923.

1,445,896

UNITED STATES PATENT OFFICE.

MARVIN C. M. LANE, OF ROSELLE PARK, NEW JERSEY, ASSIGNOR TO CAPITOL PHONOLIER CORPORATION, A CORPORATION OF NEW YORK.

VARIABLE INDUCTANCE.

Application filed June 2, 1922. Serial No. 565,417.

*To all whom it may concern:*

Be it known that I, MARVIN C. M. LANE, a citizen of the United States, and a resident of Roselle Park, county of Union and State of New Jersey, have invented certain new and useful Improvements in Variable Inductances, of which the following is a specification.

Special objects of the present invention are to combine in a simple, compact structure all the functions of a variometer, variocoupler and variable inductance, which will be capable of a fine degree of tuning throughout a comparatively wide range, including the longer as well as the usual short wave lengths.

In the accomplishment of these objects I use a single tubular core upon which there is placed a bank-wound coil provided with taps and as a continuation of that a straight wound coil, within which is journaled a rotor so positioned that it can be turned to carry its windings partly beneath the bank-wound coil.

Other novel features of the invention with the advantages following therefrom will appear as the specification proceeds.

In the accompanying drawings I have illustrated a simple and practical form of the invention, but wish it understood that the structure may be modified in various respects without departure from the true spirit and scope of the invention as hereinafter defined and claimed.

Figure 1 in the drawing referred to is a side elevation and part sectional view of the device.

The core or support consists of a tube 5 of insulating material such as bakelite, formica or the like, which may be relatively light, but should be of comparatively large diameter and of a length sufficient to hold the bank-wound and the straight-wound coils.

Figure 3:
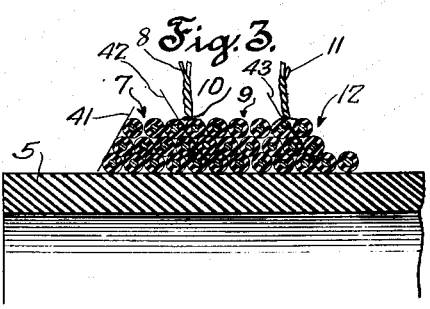
Figure 3 is an enlarged fragmentary sectional view showing a portion of the bank-winding.

The bank-winding is started near one end of the core, at 6, and is continued, usually in a three layer winding to form the first section until a point at 8 is reached where a tap is taken off, as by twisting a loop in the wire and then another section 9 is started by carrying the final turn of the first section down onto the core, as shown at 10 in Figure 3. At the end of the second section another tap 11 is taken off, the winding being thus continued section by section, as indicated at 12, 13, 14, 15 and 16, with taps at the end of each section, as shown at 17, 18, 19, 20 and 21.

Figure 2:
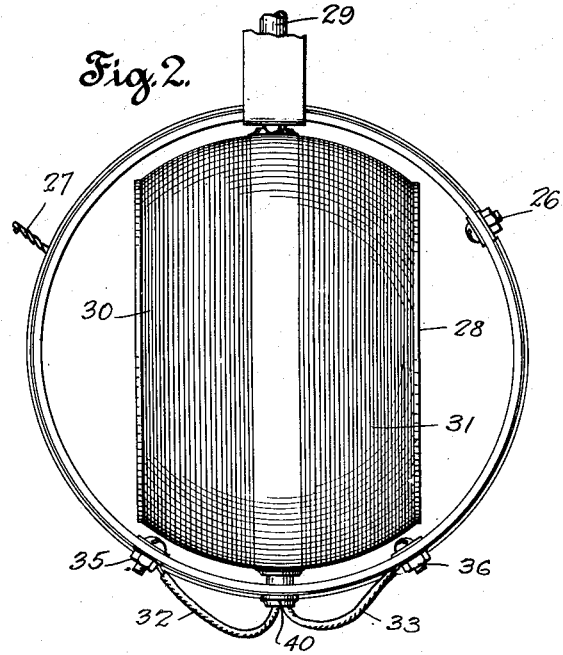
Figure 2 is an end view of the same.

In the present disclosure the stator winding is also sectionalized and is made as a single layer coil started at the end of the bank-winding. The first section of this single layer stator coil is indicated at 22 extending from the end of the bank-winding to approximately the axis of the rotor, terminating at a tap 23 and having its first terminal at 21 in common with the last section of the bank-winding. The second and third sections 24, 25 of the stator winding are disposed at the opposite side of the rotor axis, the first of these starting at the tap 23, the second ending at the binding screw 26 (Figure 2), and there being an intermediate tap 27 between these two sections. If found desirable, the stator winding may be bank-wound or made as a multiple layer winding.

The rotor is made in the form of a partly spherical core 28 secured on a tubular shaft 29 and carrying at opposite sides of its pivotal axis, coils 30, 31, connected together and having the end leads 32, 33 passed through an opening 34 in the tubular shaft and brought out the end of the shaft to binding screws 35, 36. The turning movement of the shaft is shown as limited by means of an arm 37 projecting radially from the shaft and arranged to engage a stop pin 38 upstanding from one of the bearing plates 39 in which the shaft is journaled. Washers 40 fixed on the shaft in position to engage the bearing plates serve to prevent endwise movement of the shaft and hold the rotor centrally positioned within the hollow core.

Figure 1:
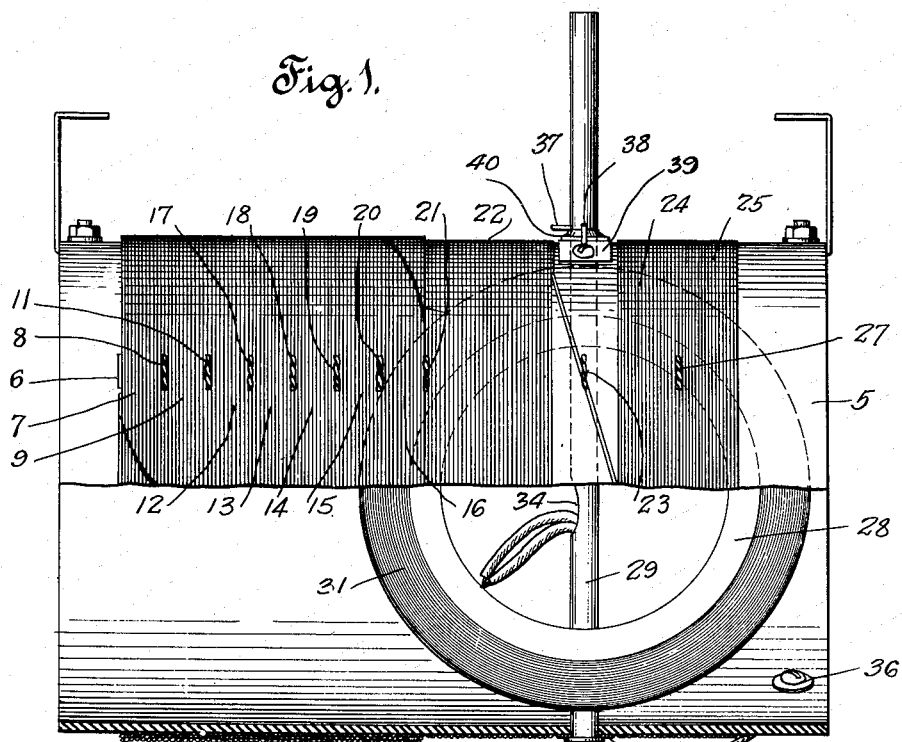

Figure 1 shows clearly how in this invention the rotor can be turned to extend partly beneath the bank-winding in addition to the stator winding, it being shown in this particular instance as extending beneath the last two sections 15, 16 of the bank-winding. This turning of the rotor under the bank-winding produces better regeneration and enables sharper tuning. The various sections may be controlled by a suitable switch (not shown) and by cutting the same into and out of circuit, tuning may be effected for both short and long wave lengths.

It will be understood that ordinarily the device as shown will be mounted on a suitable panel or other support, provision being made for such mounting in the present disclosure by means of attaching brackets 37 secured to the ends of the tubular core and adapted for engagement with the back of a panel. The rotor shaft is also shown as extended so as to carry a suitable dial or pointer for traveling over the face of the panel and the switch which controls the various sections of the bank and stator windings may be mounted on the same panel.

A special feature of the present form of bank-winding is its extreme compactness. As shown in Figure 3 the first section 7, lying between the convergent lines 41, 42 is of pyramidal or substantially triangular outline in cross section and the adjoining section 9, as defined by the lines 42, 43 is inclined to fit closely against the inclined inner side of the first section. The succeeding sections, it will be evident, will be similarly inclined and the final section will finish the coil off with a bevel, the reverse of that at the beginning of the coil providing mechanical strength and adding to the appearance of the complete coil.

What I claim is:

1. In a variable inductance, a tubular core, a stator winding on said core, a sectionalized winding on the core alongside the stator winding, a rotor adjustable in the tubular core about an axis disposed at an angle to the axis of the tubular core and carrying a winding positioned by the rotor to cooperate with both the stator winding and the sectionalized winding.

2. A variable inductance comprising an insulating tube, a sectionalized bank-winding of said tube, a sectionalized stator winding on said tube and immediately alongside the last section of the bank-winding and a rotor journaled to turn within the tube on an axis disposed at an angle to the axis of the insulating tube and carrying a winding arranged in one position of the rotor to extend beneath the stator winding and a section or sections of the bank-winding.

3. A variable inductance comprising an insulating tube, a series of coil sections on said tube and provided with taps by which the same can be controlled, a stator winding on the tube at one end of the coil sections and a rotor journaled to turn within the tube on an axis disposed at an angle to the axis of the insulating tube and arranged to project beneath both the stator winding and one or more of the coil sections.

4. A variable inductance comprising an insulating tube, a sectionalized bank-winding on said tube, a sectionalized stator winding on the tube and commencing at the end of the bank-winding, bearing plates on the tube at opposite sides of the same, a tubular shaft journaled in said bearing plates on an axis disposed at an angle to the axis of the insulating tube and having a limited rotary movement and a rotor core on said shaft within the tube and carrying coil sections arranged to project beneath both the stator winding and the bank-winding.

In witness whereof, I have hereunto set my hand this 17th day of May, 1922.

MARVIN C. M. LANE.